United States Patent [19]

Stone

[11] 3,864,240
[45] Feb. 4, 1975

[54] INTEGRATION OF A REACTION SYSTEM HAVING GRAVITY-FLOWING CATALYST PARTICLES WITH A FIXED-BED SYSTEM

[75] Inventor: Richard D. Stone, Des Plaines, Ill.
[73] Assignee: Universal Oil Products Company, Des Plaines, Ill.
[22] Filed: Mar. 9, 1973
[21] Appl. No.: 339,820

[52] U.S. Cl. .................................. 208/64, 208/65
[51] Int. Cl. ...................... C10g 35/04, C10g 35/08
[58] Field of Search ........................... 208/64, 65, 89

[56] References Cited
UNITED STATES PATENTS

| | | | |
|---|---|---|---|
| 2,809,922 | 10/1957 | Berg et al. ............................ | 208/64 |
| 2,861,942 | 11/1958 | Beckberger ........................... | 208/65 |
| 3,003,948 | 10/1961 | Evans ................................... | 208/64 |
| 3,128,242 | 4/1964 | Bergstrom et al. ................... | 208/65 |
| 3,647,680 | 3/1972 | Greenwood et al. ................. | 208/65 |
| 3,725,249 | 4/1973 | Vesely et al. ......................... | 208/139 |

*Primary Examiner*—Paul M. Coughlan, Jr.
*Assistant Examiner*—S. Berger
*Attorney, Agent, or Firm*—James R. Hoatson, Jr.; Robert W. Erickson; William H. Page, II

[57] ABSTRACT

A hydrocarbon feed stream is reacted and converted in an integrated system via serial-flow through (i) a fixed-bed catalytic reactor and (ii) a reaction system having a bed of catalyst particles which are movable therethrough via gravity-flow. At least periodically, catalyst particles are withdrawn from the latter and transported to a regeneration system through which the catalyst particles are also movable by way of gravity-flow. Regenerated catalyst is returned to the reaction system from which it was withdrawn.

5 Claims, 1 Drawing Figure

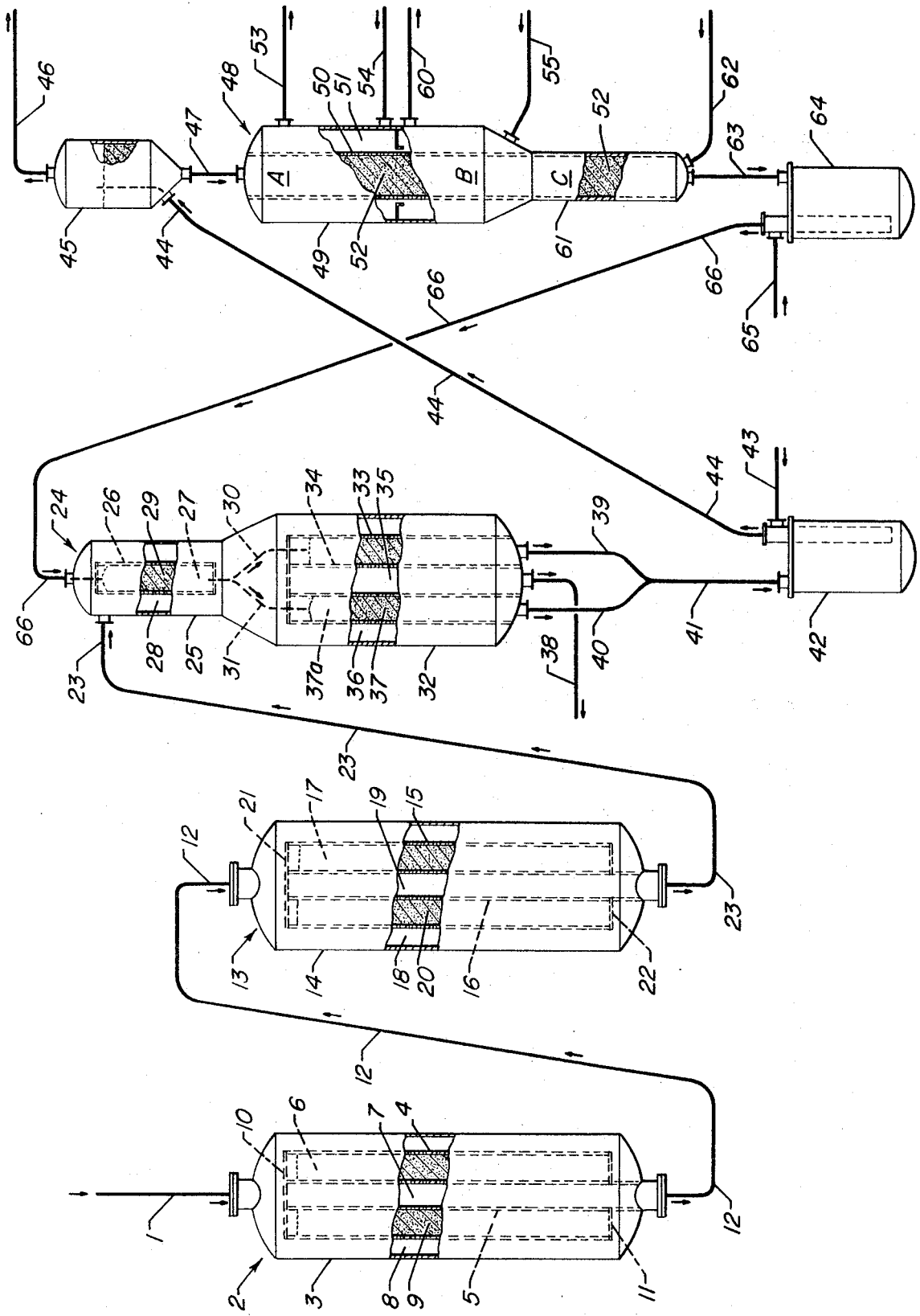

INTEGRATION OF A REACTION SYSTEM HAVING GRAVITY-FLOWING CATALYST PARTICLES WITH A FIXED-BED SYSTEM

APPLICABILITY OF INVENTION

The multiple-stage process herein described is intended to be employed in the catalytic conversion of a hydrocarbon reactant stream. More specifically, my inventive concept encompasses a combination process for hydrocarbon conversion wherein the reactant stream flows serially through (i) a fixed-bed catalytic reactor and (ii) a reaction system containing a bed of catalyst particles which are movable through the system via gravity-flow, and is particularly directed toward those conversion processes which are effected in vapor phase.

Recognition must be made of the fact that multiple-stage reaction systems, for effecting the fixed-bed catalytic conversion of a hydrocarbon stream, are well known and thoroughly described in the literature. Although the precise design and construction of any given system will depend to a great extent upon the process being effected, the conversion of the reactant stream will be generally conducted in upward, downward or radial flow. Experience in the operation of a multitude of fixed-bed processes dictates the advisability of flowing the reactant stream downwardly through the fixed-bed of catalyst particles. In order to achieve the most advantageous and technically-sound contact between the hydrocarbon reactant stream and catalyst particles, the latter are disposed in an annular-form section through which the reactant stream flows laterally and radially. Tubular-form components are vertically and coaxially disposed to form the reaction chamber. The outer chamber contains a catalyst-retaining screen, having a nominal, internal cross-sectional area less than the chamber, and a perforated centerpipe having a nominal, internal cross-sectional area less than that of the catalyst-retaining screen. The reactant stream is introduced into the annular-form space created between the inside wall of the chamber and the outside of the catalyst-retaining screen. The latter forms an annular-form catalyst holding zone with the outside surface of the centerpipe. The reactant stream, preferably in vapor phase, flows laterally and radially through the screen and catalyst zone into the centerpipe and out of the reaction chamber. Judicious design, construction and operating considerations require that the openings both in the centerpipe and screen be sized to prevent the passage of catalyst particles therethrough. Furthermore, although the tubular-form configuration of the various components may take any suitable shape — i.e., triangular, square, oblong, diamond, etc. — many design, fabrication and technical operating aspects indicate the advantage of utilizing components which are substantially circular in cross-section.

Many types of hydrocarbon conversion systems utilize multiple-stage reactors, generally in side-by-side configuration. In petroleum refining technology, such systems have been used for catalytic reforming, fixed-bed alkylation, hydrorefining, hydrocracking, dehydrogenation, steam reforming, hydrogenation, etc. In the interest of brevity, and not with the intent of specifically limiting my invention beyond the scope and spirit of the appended claims, the following discussions will be principally directed toward a process for the catalytic reforming of naphtha fractions. It remains understood, however, that my inventive concept affords a distinct improvement in other hydrocarbon conversion processes as above delineated.

Historically, a catalytic reforming process was effected continuously in a non-regenerative, fixed-bed system consisting of a plurality of reaction zones in side-by-side relation, with the reactant stream flowing serially therethrough. When the catalytic composite had become deactivated to the extent that continued operation was no longer economically feasible, the system was shut down and the catalyst regenerated in situ. After several such regenerations, the catalyst was replaced and the deactivated catalyst subjected either to an exotic reconditioning technique, or to an involved, tedious method for the recovery of the catalytically active metals. Of more recent vintage is the so-called "swing-bed" system in which an extra reactor is substituted for one which is due to come off-stream for the purpose of catalyst regeneration. This type of system gained wide acceptance, notwithstanding the required increase in catalyst inventory and complex manifolding required to divert the reactant stream around the swing reactor, since the entire unit was not caused to be shut down, except for major operational upsets, or periodic turn-arounds for maintenance purposes. Inherently, however, the swing-bed system possesses the significant disadvantage accompanying the sudden replacement of an entire zone of deactivated catalyst with freshly regenerated catalyst, thereby resulting in operational upsets with respect to steady, lined-out conditions as well as product yields and quality.

Still more recently, a "stacked" reactor system has been provided in which the catalyst particles flow, by way of gravity, downwardly from one annular-form catalyst zone to another. Ultimately, the catalyst is transferred to a suitable regeneration system, preferably also functioning with a downwardly moving bed of catalyst. The catalyst particles are maintained in the reactor system, and transferred from one zone to another in such a manner that the flow of particles may be continuous, at frequent intervals, or at extended intervals, with the movement being controlled by the quantity of catalyst withdrawal from the lowermost of the series of individual zones.

Illustrative of a reaction system, wherein the reactant stream is caused to flow laterally and radially through the catalyst bed is that described in U.S. Pat. No. 2,683,654 (Class 23–388). The reactor shown is intended for the common fixed-bed system wherein the catalyst is either subjected to in situ regeneration, or replaced. The reactant stream flows from an outer annular-form space, through a catalyst-retaining screen and catalyst particles disposed in an annular space, and into a perforated centerpipe, through the bottom of which it emanates from the reaction chamber.

U.S. Pat. No. 3,470,090 (Class 208–138) illustrates a side-by-side reaction system with intermediate heating of the reactant stream. Catalyst withdrawn from a reaction zone is sent to suitable regeneration facilities, rather than to the next succeeding reaction zone. The stacked catalytic reforming configuration is shown in U.S. Pat. No. 3,647,680 (Class 208–65) as a two-stage system with an integrated regeneration system. The latter two techniques utilize a downwardly-moving bed of catalyst particles through which the reactant stream flows. In both of these systems, the reactant stream flows serially through the reaction zones.

The present inventive concept involves the integration of a fixed-bed reaction system with one through which the catalyst particles are movable by way of gravity-flow, thereby providing a multiple-stage process capable of performing its intended function for an extended period of time. Through the utilization of my invention, an existing, multiple-stage, fixed-bed system can be revamped such that extended acceptable catalyst life is afforded. Most of the advantages of a modern, moving-bed system are provided, but at substantially lower cost due to the extensive utilization of existing equipment in the revamped unit.

OBJECTS AND EMBODIMENTS

A principal object of my invention is to provide a multiple-stage hydrocarbon conversion process. A corollary objective is to afford a combination conversion process wherein a hydrocarbon reactant stream flows serially through (i) a fixed-bed, catalytic reaction zone and, (ii) a second reaction zone containing a bed of catalyst particles movable therethrough via gravity-flow.

Another object is to provide a method which facilitates the revamp of an existing multiple-stage, fixed-bed reaction system in order to effect a significant extension of the period of time during which the process functions acceptably.

Therefore, in one embodiment, my invention is directed toward a multiple-stage process for the catalytic conversion of a hydrocarbon feed stream which comprises the steps of: (a) reacting said feed stream in a fixed-bed, catalytic first reaction zone; (b) introducing at least a portion of the resulting first zone effluent into a second reaction zone containing a bed of catalyst movable therethrough via gravity-flow, and further reacting said effluent in contact with said movable catalyst; (c) withdrawing, at least periodically, catalyst from said second reaction zone, while simultaneously recovering converted hydrocarbon effluent therefrom; and, (d) at least periodically adding fresh, or regenerated catalyst to said second reaction zone.

Another embodiment of the present invention affords an improvement in a catalytic reforming process for the multiple-stage, fixed-bed conversion of a hydrocarbon feed stream, in which process (i) the plurality of stages contain different quantities of catalyst, and (ii) the feed stream is first introduced into that stage containing the least amount of catalyst, which improvement comprises: (a) removing said stage, containing the least amount of catalyst, from said process; (b) introducing said feed stream into another of said multiple, fixed-bed stages for reaction in contact with the catalyst therein; (c) further reacting the resulting partially reacted effluent in a reaction zone containing a bed of catalyst particles movable through said zone via gravity-flow; (d) at least periodically withdrawing catalyst from said reaction zone, while simultaneously recovering converted hydrocarbon effluent therefrom; and, (e) at least periodically adding fresh, or regenerated catalyst to said reaction zone.

Other objects and embodiments relate generally to preferred operating conditions and techniques. In one such other embodiment, the hydrocarbon conversion is effected in vapor phase. In another, more specific embodiment, the improvement involves charging the hydrocarbon feed stream serially through a plurality of fixed-bed stages in the order of increasing catalyst quantity, the effluent from the last of which is introduced into said reaction zone containing the bed of catalyst particles movable therethrough via gravity-flow.

These, in addition to other objects and embodiments of my invention, will become evident from the following, more detailed description.

SUMMARY OF INVENTION

As hereinbefore stated, my invention is applicable to a multitude of various hydrocarbon conversion processes, and especially to those which are effected in vapor phase. Illustrative, but not intended as limiting, is the multiple-stage process, for hydrogenating and hydrorefining of coke-forming hydrocarbon distillates, described in U.S. Pat. No. 3,696,022 (Cl. 208–57). Briefly, the reactions are effected in three principal reaction zones, the first two of which function at temperatures in the range of 200°F. to about 500°F., while the third reaction zone functions at a temperature of 500°F. to 1,000°F. The catalytic composite in the third reaction zone suffers a relatively more rapid rate of deactivation than that in the second zone, for example. This primarily results from an increased coke laydown stemming from the need to operate at the increased temperature level. In this situation, either the second, or third zone is removed from the system, and the feed stream otherwise charged to that zone is introduced into the reaction system containing the catalyst particles in the form of a movable bed. Similarly, in a process for hydrocracking a heavier-than-gasoline feed stock — i.e., a 400°F. -550°F. kerosene fraction — to maximize LPG production, in which process the first stage principally serves as a hydrorefining zone, the second stage to convert the contaminant-free kerosene into hydrocarbons boiling below 400°F., and the third stage to produce the propane/butane-rich LPG product, the last zone is preferably removed from the system and the second zone effluent charged to the substituted zone containing the movable bed of catalyst.

Perhaps the most significant advantages stem from the use of the present invention in a process for the catalytic reforming of naphtha fractions for the purpose of improving the motor fuel anti-knock characteristics thereof. Catalytic reforming is primarily an endothermic process effected in a plurality of reaction zones having interstage heating facilities therebetween. Typically, reforming catalysts are utilized in substantially spherical form having a nominal diameter ranging from about 1/32-inch to about ⅛-inch. The operation is effected in vapor phase at catalyst temperatures from 700°F. to about 1,000°F.; judicious operating techniques generally dictate that catalyst bed temperatures be limited to a maximum of about 1,020°F. Other conditions include a pressure from 50 psig. to about 1,000 psig., a liquid hourly space velocity of from 0.2 to about 10.0 and a hydrogen to hydrocarbon mole ratio from 0.5:1.0 to about 20.0:1.0. Catalytic reforming reactions are multifarious, and include the dehydrogenation of naphthenes to produce aromatics, the dehydrocyclization of paraffins directly to aromatics, the hydrocracking of longchain paraffins into lower-boiling, normally liquid material, and, to a certain extent, the isomerization of paraffins. These reactions are effected through the use of a Group VIII noble metal combined with a halogen component and a porous carrier material; with respect to the latter, alumina is generally preferred. Recent investigations have indicated that more advantageous results are enjoyed through the cojoint use of a catalytic modifier; these are generally selected from the group of rhenium, cadmium, germanium, tin, lead, titanium, vanadium, and various mixtures thereof.

Catalytic reforming is a process well known, and thoroughly described in the literature, having been an important tool of the petroleum refining industry for almost a quarter of a century. One of the many things gleaned from vast amounts of reforming experience and resulting knowledge, is the soundness of utilizing multiple stages, each containing a different quantity of catalyst, generally expressed as volume percent. For the most part, a commercial catalytic reforming unit will comprise at least three individual reaction zones; for the present illustration, the discussion which follows will be limited to a system of three zones. The reactant stream, hydrocarbon feed and hydrogen, will flow serially through the zones in the order of increasing catalyst volume, with, of course, interstage heating. Typical catalyst loadings are: first, from 10.0% to about 30.0%; second, from 20.0% to 40.0%; and, third, from 40.0% to 60.0%.

The predominating force behind the deactivation of hydrocarbon conversion catalyst, barring unusual events such as arsenic-contamination in the feed stock, or a temperature run-away, is the continual deposition of coke and other carbonaceous material onto the surfaces and centers of the catalyst particles. The effect is very noticeable in regard to reforming catalytic composites. This is in part due to the individual characteristics of the multitude of reactions which go to the heart of the overall process. As a result of these various reactions, the bulk of the carbon laydown (on a weight percent basis) takes place in the last reaction zone of the series. Thus, not only is the quantity of catalyst greater in the last reaction zone, but the same deactivates at a faster rate than that disposed in the preceding reaction zones. For example, a common catalyst loading, for a three reactor system, might be approximately 20.0% in the first reactor, 30.0% in the second reactor and 50.0% in the third, on a volumetric basis. It must be appreciated that these figures are approximate due to the peculiar problems which are encountered during the loading of fresh catalyst — i.e., spillage, etc. When the reforming catalyst is a composite of platinum and one or more metal modifiers, the operation may continue for extended periods with increased carbon deposition. Upon termination, analyses generally indicate about 4.0% to 10.0% by weight of carbon on the catalyst in the first zone, about 6.0% to 15.0% in the second and from 8.0% to about 20.0% in the third. Therefore, in existing fixed-bed systems, the entire unit must be shut down in order to regenerate the third-stage catalyst, notwithstanding that the catalyst in the first two zones frequently possesses sufficient activity to function acceptably.

Other petroleum refining technologists have appreciated the fact that the catalyst in the initial stages of a catalytic reforming unit is not "worked" as hard as that in the final stages. This inequity of work load results in inefficient utilization of some of the catalyst. One attempt to smooth out the work load, that of adding parallel reactors in the terminal position, constitutes a prohibitively expensive solution. Those having the requisite skill in the art will readily appreciate the additional cost, increased catalyst inventory and unit complexity stemming from such a change. Regardless, the catalyst in the terminal stage will suffer the greatest degree of deactivation with respect to carbon deposition.

The process encompassed by the present inventive concept offers a solution to this enigma, both with respect to an existing unit, and one which is being designed. Considering first the latter, the three reactor system is designed to have two initial fixed-bed reaction zones and a third zone through which the catalyst is movable by gravity flow. The catalyst loading, for example, from first to third, is 5.0/7.0/3.0, on a volumetric basis. With respect to an existing unit, the first reactor, containing the least amount of catalyst, is scrapped, or put to another use — i.e., as a hydrorefining guard chamber, or filled with a hydrocracking catalyst having the propensity for converting long-chain paraffins into lower-boiling isomeric compounds. The reactor having the moving bed of catalyst particles is integrated with the remaining two fixed-bed reactors as the last reaction zone in the system. Catalyst particles are withdrawn from the moving-bed reaction zone continuously, at frequent intervals, or at extended intervals, transported to a regeneration system, through which the particles are also movable via gravity flow, and returned to the top of the last reactor. Alternatively, spent catalyst may be collected until a sufficient quantity is available to make batch regeneration of the catalyst feasible. Continuous regeneration is much to be preferred in view of the better control made possible in a continuous process, lower catalyst loss due to breakage and a lower catalyst inventory requirement.

As a general rule, the residence time of catalyst in the moving-bed reactor ranges from a few days to a month; at present, a one week residence time seems optimum. Very high catalyst circulation rates — i.e., a short residence time — result in an increased load on catalyst regeneration facilities. Slower catalyst circulation — i.e., a long residence time — limits the LHSV and product octane rating because higher space velocities, or more severe reforming conditions would increase coke laydown while the catalyst is in the reforming zone.

The first two reaction zones of the present multiple-stage process, each having a fixed-bed of catalyst, may now function acceptably virtually two to three times as long as those in existing units. Thus, catalyst carbon levels in the first and second reaction zones may approach 10.0% to about 15.0% by weight prior to the time that efficient operation declines significantly. In some instances, it will be preferred to oversize slightly the initial two reaction zones, at the expense of somewhat greater catalyst inventory, to provide an extra margin of operating time between shut-downs.

With respect to revamping an existing, fixed-bed reforming unit, the significant advantages accruing from the practice of the present invention will immediately become apparent to those skilled in the petroleum refining arts. These advantages can best be illustrated by considering a unit which processes 150 cubic meters per hour of charge stock at a 1.0 liquid hourly space velocity. In such a unit, a common, current catalyst distribution, on a cubic meter basis, is 30.0/50.0/70.0, in the three reactors respectively. This illustrative unit is capable of efficient operation for about nine months before carbon deposition in the final reactor causes the operation to deteriorate. Analyses indicate that the carbon level, at shut-down, approximates 6.7%, 8.4% and 16.3% in reactors 1, 2 and 3, respectively. To revamp this existing unit, in accordance with one embodiment of my invention, reactor 1 is removed from the system, and the manifolding changed such that reactors 2 and 3 become reactors 1 and 2, respectively. The old reactor 1 is modified internally to permit operation as a moving-bed reactor, and becomes reactor 3 of the system. Initially, it might be thought that the smaller third reactor would tend to limit the charge capacity of the unit in view of the fact that, historically, the terminal reactor contained a greater quantity of catalyst than any other reactor in the system. However, due to the ability to regenerate continuously in a moving-bed system, higher space velocities are possible. A moving-bed catalytic reforming system can be designed to function acceptably at a liquid hourly space velocity of about 8.0, although an LHSV in the range of about 2.0 to about 4.0 is more common. In effect, the third reaction zone may function at an overall LHSV approximately 2.33 times that at which the old, fixed-bed third reactor could function. In some situations, modification of the interstage heaters may be required to heat the reactant stream entering the third, moving-bed reactor to a sufficiently high temperature required to make the desired product octane at a 2.33 liquid hourly space velocity. With respect to the prior operation effected at a space velocity of 1.0, the catalyst bed temperature will be increased about 10°F. to about 35°F.; however, the significant consideration is that the quantity of catalyst disposed within the third reactor does not constitute a restriction on the process.

The requirements of the heaters serving new reactors 1 and 2 will decrease in view of the decrease in liquid hourly space velocity therethrough. This is due to the average inlet temperature requirement for reactor 1 being about 20°F. lower, while the average inlet temperature requirement for reactor 2 will be decreased about 16°F. In effect, this provides extra heater capacity which permits an increase in the charge rate to the unit without necessitating a modification of heater capacities. As an alternative, it may be advantageous to switch heaters within the unit; thus, the practice of the present invention affords operational flexibility as a result of lowering the temperature requirements of new reactors 1 and 2.

The expected, efficient "on-stream" catalyst life of the present combination process can be reasonably estimated. Catalyst life for a given reactor can be considered proportional to the quantity of carbon deposition. Actually, as recognized by those skilled in the art, the rate of carbon deposition decreases with time. That is, the greater proportion of the overall carbon deposition will occur in the early time segment of an operation. Since the rate of carbon deposition decreases as the run length increases, the combination process of the present invention will afford on-stream time for a period of time longer than the following simplified computations would indicate. With respect to new reactor 1, containing 50.0 cubic meters of catalyst, thus being 67.0% larger than old reactor 1 containing 30.0 cubic meters of catalyst, it should provide approximately 67.0% more on-stream time before regeneration becomes necessary. This is due to the fact that catalyst life, expressed as barrels of charge stock per pound of catalyst disposed within the reaction zone, is virtually independent of the liquid hourly space velocity. Additionally, however, acceptable operation of reactor 1 may continue until the catalyst has attained a carbon level of approximately 15.0% by weight. With respect to existing fixed-bed systems, the down-stream reactors, especially the terminal reactor, always deactivated before coke deposition limits on the first reactor were attained. Thus, the expected "on-stream" life of new reactor 1 can be estimated by considering that the same is directly proportional both to the quantity of catalyst disposed within the reaction zone as well as the increased carbon deposition permitted. Therefore, the expected catalyst life of new reactor 1 is equivalent to (9 months) (50/30)(15/6.7), or better than 33 months. Utilizing the same relationships, the expected on-stream catalyst life of the new second reactor, containing 70.0 cubic meters of catalyst is equal to (9 months) (70/50)(15/8.4), or somewhat more than about 22 months.

It should be noted that the second reactor will now limit the effective period of time for the operation of this illustrative unit. However, it is possible to increase reactor 1 inlet temperature to permit a slight, compensating decrease in reactor 2 inlet temperature, thereby extending the catalyst life in reactor 2 at the expense of a slightly diminished catalyst life in reactor 1. It can be seen, therefore, that for a minimal investment, a refiner is afforded an extension of the period of on-stream operation from about 9 months to about 2 years. A refiner now has the additional option of accompanying the revamp of his unit with an expansion in capacity or design severity. For example, a moving-bed reactor, containing 70.0 cubic meters of catalyst, may be added; this will double the charge rate, while still extending the acceptable on-stream period of operation experienced with a total fixed-bed operation.

Depending upon the economic considerations of an individual refinery, it may be advisable, in an expansion and conversion to the present combination process, to add a second compressor which permits the split-flow of hydrogen-rich recycle gas as described in U.S. Pat. No. 3,516,924 (Class 208–65). Thus, for example, as a result of an increase in charge rate, or a corresponding lowering of plant pressure, the old recycle gas compressor may not be capable of supplying sufficient hydrogen gas to maintain the desired hydrogen to hydrocarbon mole ratio. In this circumstance, the use of an additional compressor to supply the hydrogen recycle gas to only the moving-bed reactor system may be the least expensive manner for expanding an existing unit.

A refiner may further desire to alter his product slate to correspond with changing marketing demands from season to season. In some areas, gasoline demand decreases in winter, but there results a corresponding increase in the demand for liquefied petroleum gas (LPG). In a reforming operation effected to produce LPG, the last reactor can contain a catalytic composite of a noble metal, mordenite and alumina. This type of catalyst has the propensity to crack long-chain paraffins principally to propane and butane. The fixed-bed reaction zones will continue to have disposed therein a catalyst having the capability to maximize the production of high-octane aromatics. These highly desirable motor fuel components are unaffected by the mordenite-containing catalyst. Through the integration of the present combination process, a refiner may now change the catalyst in the last, moving-bed reactor, without changing the catalyst in the fixed-bed reactor. In summer months, gasoline production can be maximized by using an alumina-based catalyst in all reactors. In winter months, a mordenite-based catalyst can be cycled into the moving-bed reaction system to augment LPG production. Another attendant advantage of the present invention resides in providing all of the benefits of moving-bed reforming — i.e., continuous hydrogen supply and the ability to operate at lower pressure levels — at a lower initial investment cost. These advantages are also made available with respect to a newly designed unit. In either situation, it is preferred that the reactant stream flows serially through the plurality of fixed-bed stages in the order of increasing catalyst quantity, and then into the movinng-bed system.

In further indicating the method of effecting the present invention, reference will be made to the accompanying drawing. Illustrated in the drawing are two reaction zones of fixed-bed design, reactors 2 and 13, a reactor 24 through which the catalyst particles are movable by way of gravity-flow, and a regeneration system 48, to which catalyst withdrawn from reactor 24 is transported, and from which regenerated catalyst is returned to the top of reactor 24. For the sole purpose of illustration, the drawing is presented as a simplified flow diagram in which details such as pumps, compressors, instrumentation and controls, heat-exchange and heat-recovery circuits, valving, start-up lines and similar hardware have been eliminated or reduced in number as being non-essential to an understanding of the techniques involved. The use of such miscellaneous appurtenances, in modification of the illustrated process flow, are well within the purview of those skilled in the art.

DESCRIPTION OF DRAWING

The principal vessels depicted in the accompanying drawing are fixed-bed reactors 2 and 13, reactor 24 (through which the catalyst is movable via gravity-flow) and regenerator 48. Additionally, illustrated is a lift-engager 42 for transporting catalyst withdrawn from reactor 24 to the top of regenerator 48, a disengaging zone 45 for removing lift gas from the catalyst particles, and lift-engager 64 for transporting regenerated catalyst to the top of reactor 24. The two lift-engagers, in the manner presented, further simplify the illustrated flow. Referring to U.S. Pat. No. 3,647,680 (Cl. 208–65), previously mentioned, it will be noted that the catalyst-withdrawal and transport system includes valved-in lock hoppers between the bottoms of the reactor and regenerator, and their respective lift-engagers. It is believed that the elimination of the lock hoppers, from the present drawing, does not detract from an understanding of the present invention.

With reference now to the drawing, the same will be described in conjunction with the conversion of a straight-run naphtha fraction having a boiling range of about 175°F. to about 380°F. The catalytic composite, disposed in reactors 2, 13 and 24, constitutes about 0.375% by weight of platinum, 0.375% by weight of tin and about 0.9% by weight of combined chloride, composited with alumina in the form of spheres having a nominal diameter of 1/16-inch. The catalyst is disposed in reactors 2, 13 and 24, in volumetric ratios of 5.0/7.0/3.0, respectively. Further, there exists a lesser quantity of catalyst in regenerator 48 and in transfer lines 44 and 66. The charge stock, in admixture with hydrogen sufficient to provide a hydrogen to $C_5$-plus hydrocarbon mole ratio of about 4.0:1.0, enters the process by way of line 1, and is introduced thereby into reactor 2. The overall liquid hourly space velocity is about 2.0.

Reactor 2 is of the fixed-bed design wherein the catalyst 9 is disposed in an annular-form section 6 through which the reactant stream passes laterally and radially. The temperature at the inlet to the catalyst zone is about 905°F., and the pressure about 200 psig. Reactor 2 is shown as consisting of an outer shell, or chamber 3, having a tubular-form, and which forms an annulus 8 with catalyst-retaining screen 4; the latter has a nominal, internal cross-sectional area which is less than chamber 3. A perforated, or slotted centerpipe 5, having a nominal, internal cross-sectional area less than catalyst-retaining screen 4, forms annular catalyst-holding section 6 with retaining screen 4. The tubular-form components are held in place by top plate 10 which is imperforate except at its outer edge over annulus 8. Thus, the reactant stream, in vapor phase, passes into annulus 8, flows laterally through catalyst-retaining screen 4 and radially through catalyst 9, into the interior space 7 of perforated centerpipe 5. The vapors pass downwardly in space 7, through bottom plate 11, and are withdrawn via line 12.

Since the reforming reactions effected in reactor 2 cause a decreasing temperature gradient as the reactant stream traverses the catalyst bed, the effluent in line 12 is reheated to 915°F. prior to being introduced into the upper end of reactor 13. Again, the reactant stream flows into annulus 18 formed by outer shell 14 and catalyst-retaining screen 15, through the latter, and radially across catalyst bed 20 dispersed in annulus 17 formed by centerpipe 16 and screen 15. The vapors pass into the centerpipe and out of the reactor via space 19 and line 23. The catalyst and tubular-form components are held in place, in chamber 14, by top plate 21 and bottom plate 22.

Prior to entering reactor 24, the reactant stream is raised to a temperature of 960°F. The upper, narrower portion 25, of reactor 24, will be hereinafter described with respect to the incoming regenerated catalyst in line 66. Reactor 24 is shown as having the catalyst confined in an annular moving bed 37 which is formed by catalyst-retaining screen 33 and perforated centerpipe 34. Similarly, retaining screen 33 forms a reactant annulus 36 with the interior wall of outer shell 32. The vaporous reactant stream flows laterally from annulus 36 through retaining screen 33 and radially through catalyst bed 37. The vapors exit catalyst bed 37 through perforated centerpipe 34, and continue downwardly through cylindrical space 35. The effluent is withdrawn from space 35 via line 38, through which it is passed to conventional separation facilities for the recovery of a high octane reformate and the recovery of a hydrogen-rich gas stream, at least a portion of which is recycled to the system through line 1.

The downwardly moving catalyst particles 37, are removed from the annular zone in reactor 24 by way of transfer conduits 39 and 40. These are but two of a multiple of transfer conduits — from about 6 to about 16 — which provide uniformity of flow characteristics as the catalyst particles pass out of reactor 24. The transfer conduits 39 and 40 are very small compared to conduit 38; further, they are constantly purged with hydrogen to prevent passage of hydrocarbon vapors. There is established a minimal, but suitable pressure drop, whereby substantially all the effluent vapors are directed through line 38. The catalyst is introduced via a common header 41 into lift-engager 42.

Regenerated, or fresh catalyst is brought into the system by way of line 66, entering the narrow upper portion 25 of reactor 24. Prior to direct contact with the reactant stream in catalyst bed 37, the regenerated catalyst, in admixture with hydrogen, is processed as a dense bed 29 disposed in cylindrical space 27. The dense bed is contained by imperforate tubular member 26 which also forms annulus 28 with the interior wall of upper portion 25. Space 27 is a reduction zone which provides indirect heat-exchange of fresh or regenerated catalyst with the hot reactant vapors passing through annulus 28. The residence time of the catalyst in reduction zone 27 is about two hours. The resulting reduced catalyst bed 37 by way of transfer conduits 30 and 31, replacing that removed from the bed via transfer conduits 39 and 40. In a preferred modus operandi, the withdrawal of catalyst through conduits 39 and 40, coincides with the addition of fresh, or regenerated catalyst via conduits 30 and 31.

After passing through a lock hoppr (not illustrated), the withdrawn catalyst particles are introduced into lift-engager 42. Through the use of a suitable inert gas such as nitrogen, entering lift-engager 42 via line 43, the catalyst particles are transported by way of lift line 44 into a solids/vapor disengaging zone 45. Vapors are withdrawn through line 46, while catalyst particles are removed via line 47 and introduced thereby into regenerator system 48.

Regenerator 48 consists primarily of an outer shell 49 containing a coaxially-disposed catalyst-retaining screen 50. The nominal, internal cross-sectional areas are such that an annular space 51 and catalyst-traverse zone 52 are formed. The upper portion of regenerator 48 serves as a carbon burn-off zone "A" utilizing hot oxygen-containing gas, introduced by way of line 54, at a temperature from 830°F. to about 930°F.; the resulting gaseous products, including oxides of carbon and sulfur, are removed as flue gases from zone "A" via line 53. The catalyst particles, substantially free from carbon, are downwardly processed from carbon burn-off zone "A" through a chlorination zone "B." In this lower zone, the particles are brought in contact with about a 2.0:1.0 mole ratio of steam to chlorine introduced via line 55, at a temperature of about 930°F., being admixed with air, or other free oxygen-containing gas introduced via line 62. Steam and unused chlorine is removed from chlorination zone "B" by way of line 60.

From chlorination zone "B," the catalyst particles continue downwardly through a drying zone "C" contained in the narrow portion 61 of regenerator 48. In zone "C," the catalyst particles are stripped of vaporous material by a flow of hot dry air from line 62, the latter at a temperature in the range of about 800°F. to about 1,000°F. Dried, regenerated catalyst particles are withdrawn via a transfer conduit 63 into lift-engager 64, from which they are transported, by a lift gas stream from line 65, through line 66 into the reducing zone 27 of reactor 24.

In the foregoing illustration, believed to indicate the method of the present invention, the effective catalyst life prior to revamping as shown and previously stated, is about 9 to 10 months before regeneration. After conversion to the system encompassed by my inventive concept, the effective catalyst life would be extended to about 22–28 months before the necessity to regenerate the catalyst in the fixed-bed reactors would arise, provided plant pressure and recycle gas rates had been maintained. The lowering of the plant pressure decreases the hydrogen/hydrocarbon mole ratio to the aforementioned 4.0/1.0 ratio. Economic considerations indicate that the increased liquid yields, and hydrogen to be expected at lower pressure, justify the corresponding decrease in catalyst life. This is not disadvantageous since it permits the refiner to plan his fixed-bed regeneration to coincide with the general refinery turn-around, for normal maintenance purposes, which occurs about every 15 to 18 months.

I claim as my invention:

1. A multiple-stage process for the catalytic reforming of a hydrocarbon feed stream which comprises the steps of:
   a. reacting said feed stream in a plurality of fixed-bed, catalytic first reaction zones, said feed stream contacting said fixed-bed catalysts in lateral, radial flow, said fixed beds being in series flow with each other;
   b. introducing at least a portion of the resulting first zone effluent downwardly into a second reaction zone containing a bed of catalyst movable downwardly therethrough via gravity-flow, and further reacting said effluent in contact with said movable catalyst;
   c. withdrawing, at least periodically, catalyst from said second reaction zone, while simultaneously recovering converted hydrocarbon effluent therefrom; and,
   d. at least periodically adding fresh, or regenerated catalyst to said second reaction zone.

2. The process of claim 1 further characterized in that said feed stream is reacted in a hydrogen atmosphere.

3.. The process of claim 1 further characterized in that said feed stream is reacted in vapor phase.

4. The process of claim 1 further characterized in that said effluent contacts said movable catalyst in lateral, radial-flow.

5. The process of claim 1 further characterized in that the fresh, or regenerated catalyst is added to said second reaction zone simultaneously with the withdrawal of catalyst therefrom.

* * * * *